US007712487B2

(12) United States Patent
van de Camp

(10) Patent No.: US 7,712,487 B2
(45) Date of Patent: May 11, 2010

(54) SPIRALLY WOUND TUBE WITH VOIDS AND METHOD FOR MANUFACTURING THE SAME

(75) Inventor: Johannes Wilhelmus van de Camp, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 910 days.

(21) Appl. No.: 11/531,525

(22) Filed: Sep. 13, 2006

(65) Prior Publication Data

US 2008/0060746 A1 Mar. 13, 2008

(51) Int. Cl.
*F16L 11/00* (2006.01)

(52) U.S. Cl. ........................ 138/129; 138/130; 138/144; 242/608.4; 156/429; 428/34.2; 428/36.3; 428/36.91

(58) Field of Classification Search ................. 138/129, 138/130, 144; 242/609.4, 610.1, 118.32; 156/195, 429

See application file for complete search history.

(56) References Cited

U.S. PATENT DOCUMENTS

| | | | |
|---|---|---|---|
| 1,251,393 | A | 12/1917 | Longley |
| 2,659,543 | A | 11/1953 | Guyer |
| 3,086,558 | A | 4/1963 | MacGill et al. |
| 3,143,148 | A | 8/1964 | Worn |
| 5,505,395 | A | 4/1996 | Qiu et al. |
| 5,865,396 | A | 2/1999 | Ogg et al. |
| 6,405,974 | B1 | 6/2002 | Herrington |
| 6,540,174 | B1 | 4/2003 | Jarvinen |
| 6,705,351 | B2 | 3/2004 | Fraser |
| 6,851,643 | B2 | 2/2005 | Qiu et al. |
| 6,889,715 | B2 | 5/2005 | Fraser et al. |
| 6,939,590 | B2 | 9/2005 | van de Camp et al. |
| 6,962,736 | B1 | 11/2005 | Haapaniemi et al. |
| 2004/0096604 | A1 | 5/2004 | van de Camp |
| 2004/0144885 | A1 | 7/2004 | Qiu et al. |
| 2006/0043234 | A1 | 3/2006 | Chen |

FOREIGN PATENT DOCUMENTS

| | | |
|---|---|---|
| JP | 9234808 | 9/1997 |

OTHER PUBLICATIONS

Search Report for corresponding European Application No. 07252934 completed Nov. 5, 2007.

*Primary Examiner*—Patrick F Brinson
(74) *Attorney, Agent, or Firm*—Alston & Bird LLP

(57) ABSTRACT

A tube having enhanced inner diameter stiffness is provided. The tube includes a wall having an inner zone, intermediate zone, and an outer zone. The intermediate zone includes a plurality of partially offset and overlapped plies that form a number of non-radial spokes and voids extending from the inner zone and the outer zone. The non-radial spokes of the tube facilitate the transmission of torque from the inner zone to the outer zone during winding and handling operations, while insulating the inner diameter from radial pressure on the outer zone. The spokes and voids may essentially extend around the entire circumference and length of the tube and thus provide for more consistent properties throughout the tube.

14 Claims, 4 Drawing Sheets

SPIRALLY WOUND TUBE WITH VOIDS AND METHOD FOR MANUFACTURING THE SAME

BACKGROUND OF THE INVENTION

1) Field of the Invention

The invention relates to tubes made by spirally winding a plurality of paperboard plies about a forming mandrel and adhering the plies together.

2) Description of Related Art

Spirally wound tubes are used in a variety of applications in which radially inward compressive forces are imposed on the outside diameter of the tubes. For example, continuous materials such as paper, plastic film, metal sheet, and textiles are commonly wound about winding cores formed of spirally wound paperboard tubes. The winding tension required for winding a stable roll of such materials results in substantial compressive forces being exerted by the wound material on the tube in the radially inward direction. Such forces are in a direction to tend to force the inner diameter of the tube to shrink in size. This phenomenon has been referred to as "ID comedown."

The degree to which a given paperboard tube resists such inner diameter reduction under a given load is referred to herein as the ID stiffness of the tube. The ID stiffness may be expressed as the amount of radially inward uniform compressive pressure on the tube OD that the tube can withstand for a given amount of inner diameter reduction; thus, for instance, the ID stiffness may have units of psi per inch of inner diameter reduction.

In web winding applications, it is desirable to have a high ID stiffness so that the tube can readily be removed from a winding apparatus after a roll of web material is wound onto the tube. A winding apparatus typically includes some type of chuck or mandrel that is inserted into the tube and is radially expanded to grip the core from the inside. If the tube inner diameter shrinks too much as a result of the forces imposed by the wound material, it can be difficult or impossible to remove the tube from the winding apparatus without destroying the tube.

The assignee of the present application has previously discovered that the tendency of a winding core to experience ID comedown can be reduced by forming the core wall to have a radially central region whose compliance in the radial direction is increased relative to that of the core wall regions lying radially inward and radially outward of the central region. See, for example, U.S. Pat. No. 5,505,395, incorporated herein by reference. In the '395 patent, this increased compliance was achieved by using paperboard plies of lower density and strength in the central region of the wall relative to the density and strength of the plies lying radially inward and outward of the central region. Also see, for example, U.S. Pat. No. 6,851,643, incorporated herein by reference. In the '643 patent, this increased compliance was achieved by intentionally introducing wide ply gaps into one or more plies of the central region.

While the approaches represented by the '395 and '643 patents are effective in enhancing the ID stiffness of tubes, it would be desirable to be able to achieve even greater gains in ID stiffness, and to do so in a cost-effective manner.

BRIEF SUMMARY OF THE INVENTION

The present invention addresses the above concerns and achieves other advantages by providing a spirally wound paperboard tube having one or more non-radial spokes for enhanced ID stiffness. In general, the tube is made by spirally winding a plurality of plies together. More specifically, a plurality of plies form an intermediate zone in the tube having one or more spokes that extend outward with both radial and circumferential directional components from an inner zone to an outer zone. The non-radial spokes of the tube facilitate the transmission of torque from the inner zone to the outer zone during winding and handling operations, while insulating the inner diameter from radial pressure on the outer zone.

According to one embodiment, the spirally wound tube includes an inner zone, an outer zone, and an intermediate zone. The inner zone extends radially from an inner surface of the tube outwardly and includes at least one inner layer of one or more inner plies. The inner surface defines an inner diameter of the tube. The outer zone extends radially from an outer surface of the tube inwardly and includes at least one outer layer of one or more outer plies. The intermediate zone includes a plurality of intermediate layers and each intermediate layer has at least one intermediate ply. The intermediate plies of the intermediate zone define one or more non-radial spokes extending from the inner zone to the outer zone.

The intermediate zone further defines one or more voids between the spokes. For example, the intermediate zone may define a first spoke and a second spoke and a first void and a second void between the first and second spokes. The intermediate zone may also include one or more bridge layers for connecting the first and second spokes together.

The spokes collectively may extend along the entire circumference of the tube. For example, the intermediate zone may have two spokes, with each spoke extending over one half of the circumference. Each spoke may also have a portion that circumferentially overlaps a portion of another spoke.

According to another embodiment, the intermediate plies of each intermediate layer are spirally wound such that a gap exists between the consecutive turns of the intermediate plies. The gaps of radially adjacent intermediate layers have overlapping portions that together define one or more voids in the intermediate zone. Each void extends circumferentially for a distance greater than a width of any of the intermediate plies and radially for a distance greater than a thickness of any of the intermediate plies. For example, one or more of the voids may extend over a quarter of the circumference of the tube. The voids collectively may extend along the entire circumference of the tube and include overlapping portions with each other.

In yet another embodiment, the present invention provides a method of making the paperboard tube having at least one non-radial spoke within the tube. The method includes spirally winding one or more inner plies about a forming mandrel to form an inner tube wall zone on the mandrel. The method further includes spirally winding one or more intermediate plies to form a first intermediate layer having gaps between consecutive turns of the intermediate ply or plies and then partially offsetting one or more intermediate plies of a second intermediate layer to the intermediate ply or plies of the first intermediate layer such that each ply of the second intermediate layer partially overlaps a ply of the first intermediate layer. The partially offset ply or plies of the second intermediate layer is spirally wound to form a second intermediate layer such that the gaps of the first and second intermediate layers collectively form voids and the partially overlapping plies collectively form non-radial spokes. The method also includes spirally winding one or more outer plies for forming an outer tube wall zone.

The steps of spirally winding and partially offsetting the plies of the first and second intermediate layers may be repeated for preceding and subsequent intermediate layers including partially offsetting the plies of a subsequent layer with the plies of a preceding layer. The method may also include spirally winding one or more plies for forming a bridge layer that extends from a first spoke to a second spoke.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings in which some but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
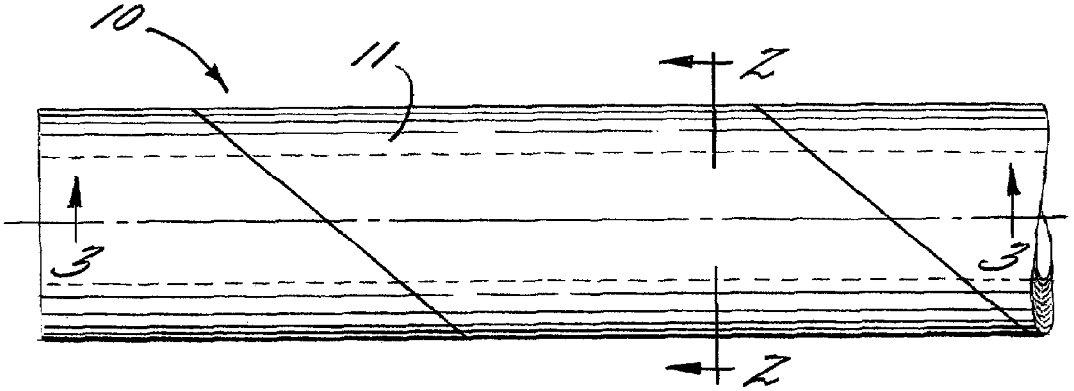
FIG. 1 is a perspective view of a portion of a tube according to one embodiment of the present invention.
Figure 2:
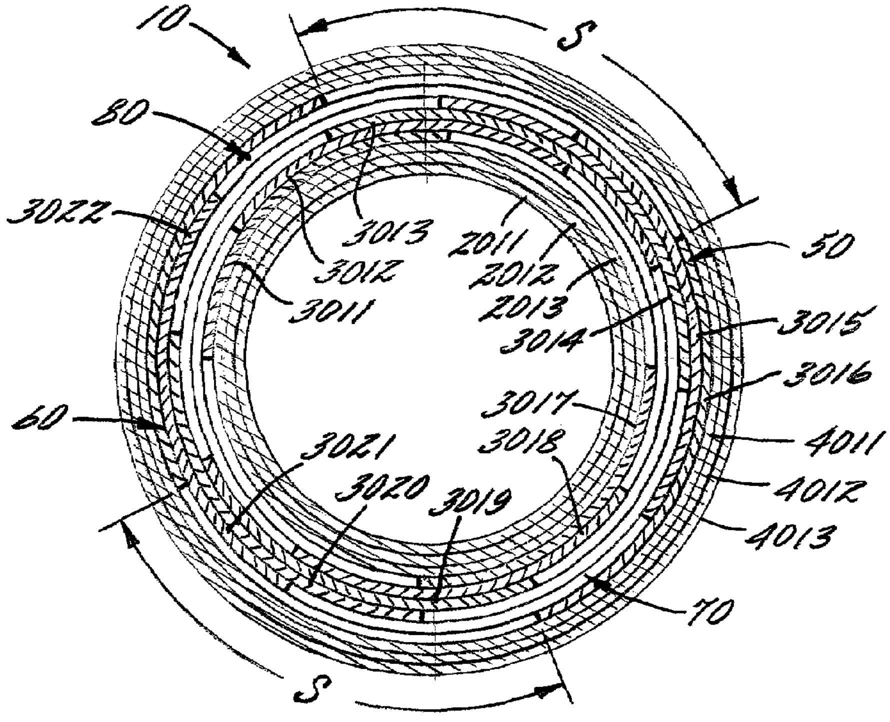
FIG. 2 is a cross-sectional view of the tube shown in FIG. 1 taken substantially along line 2-2, with the outer zone of the tube in place.
Figure 3:
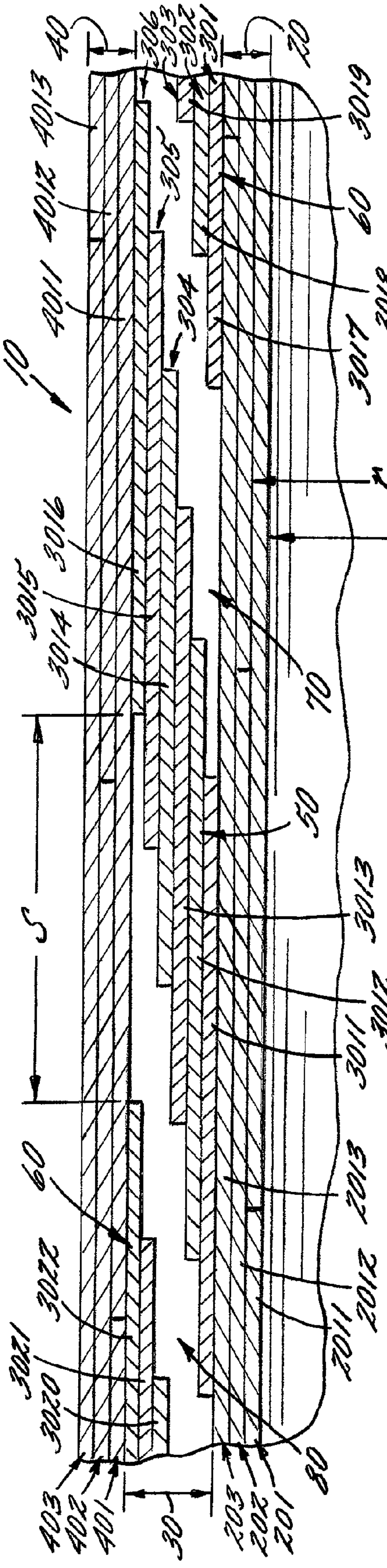
FIG. 3 is a cross-sectional view of the tube shown in FIG. 1 taken substantially along line 3-3, with the outer zone of the tube in place.

FIGS. 1 through 3 show a spirally wound tube 10 in accordance with one embodiment of the present invention. The tube 10 extends around and along an axis for a predetermined length from a first end to a second end. As best shown in FIG. 2, the cross-section of the tube relative to the axis defines a circumference.

As illustrated in FIG. 3, the tube includes a wall 11 having an inner zone 20, an intermediate zone 30, and an outer zone 40. The inner zone 20 is located inwardly and radially extends from an inner surface of the tube to the intermediate zone 30. The intermediate zone 30 radially extends from the inner zone 20 to the outer zone 40. The outer zone 40 is located outwardly and radially extends from the intermediate zone 30 to an outer surface of the tube. The inner surface defines an inner diameter of the tube and the outer surface defines an outer diameter of the tube. The inner and outer zones 20, 40 comprise one or more layers, and each layer in turn comprises one or more plies. For example, according to the illustrated embodiment of FIGS. 1 through 3, the inner and outer zones 20, 40, each have three layers 201, 202, 203, 401, 402, 403. Layers in the inner zone are referred to herein as inner layers and layers in the outer zone are referred to herein as outer layers due to the location of the layers. The intermediate zone 30 comprises two or more layers, and each layer in turn comprises one or more plies. For example according to the illustrated embodiment of FIGS. 1 through 3, the intermediate zone 30 has 6 layers 301-306. Each layer in intermediate zone is referred to herein as an intermediate layer due to the layer's location.

As used herein, a "layer" is a region of the tube 10 delimited by an outer radius $r_0$ and an inner radius $r_i$ that respectively correspond to an outer surface and inner surface of a "ply" of that layer as best seen in FIG. 3. A "ply" is a unitary sheet of material that, when wound into the tube 10, constitutes at least a part of a single layer of the tube 10. Thus, in accordance with the present invention, a layer can comprise more than one ply occupying the region bound by $r_0$ and $r_i$.

In the illustrated embodiments, each inner layer 201, 202, 203 respectively includes one ply 2011, 2012, 2013, also referred to herein as an inner ply due to its location within an inner layer. Each inner ply 2011, 2012, 2013 is wound so that nominally it has no substantial gaps between its adjacent edges along the length of the tube 10 as generally described in U.S. Pat. No. 6,851,643. "Nominally" means that the objective is to wind the inner ply so that a perfect butt joint exists between the adjacent edges. However, in practice, a perfect butt joint may not always be achieved, and typically small gaps are inadvertently created between the edges of the ply. In general, such inadvertent gaps will be relatively small compared to the width of the plies.

Similarly, each outer layer 401, 402, 403 respectively includes one ply 4011, 4012, 4013, also referred to herein as an outer ply due to its location within an outer layer. Each outer ply 4011, 4012, 4013 is wound so that nominally it has no substantial gaps between its adjacent edges along the length of the tube 10.

It should also be noted, as further described in U.S. Pat. No. 6,851,643, it is known from geometrical considerations applicable to spiral winding that to achieve a perfect butt joint, the width of ply, the diameter of the ply, and the spiral wind angle are related. Basically, the width, the angle, or both must increase as the diameter of the ply increases. Therefore, one in the art would appreciate that either the spiral wind angle, the width of the ply, or both may vary between layers to account for the above-mentioned geometrical considerations.

In contrast to the inner layers 201, 202, 203 and outer layers 401, 402, 403, the intermediate layers 301-306 are wound such that a gap exists between consecutive turns of a ply or adjacent plies. More specifically and as stated above, each intermediate layer may include one or more plies. Plies in an intermediate layer are referred to as intermediate plies due to their location. In an intermediate layer having only one intermediate ply, a relatively wide gap is intentionally created between the adjacent edges of consecutive turns of that ply. The gap extends helically along the tube at the spiral wind angle at which the ply is wound. In an intermediate layer having more than one ply, such as in the illustrated embodiments, relatively wide gaps S are intentionally created between the adjacent plies 3011-3022 of the layers 301-306, as further discussed in U.S. application Ser. No. 11/225,547 assigned to the assignee of the present application and hereby incorporated by reference in its entirety. The intermediate plies may be substantially narrower than the outer and inner plies for forming the gaps and the intermediate plies may be "mini-plies," as further discussed in U.S. application Ser. No. 11/225,547. (As explained further below, plies of a bridge layer may be closer in width to the outer and inner plies than to a typical intermediate ply, even though the bridge layer is in the intermediate zone.) For example, one or more of the inner and outer layers may each have one inner or outer ply, wherein the width of each the inner and outer plies is approximately 5" and one or more of the intermediate layers may have two intermediate "mini-plies", wherein the width of each mini-ply is approximately 1¼", with a 1¼" gap between the two mini-plies.

As best seen in FIG. 2, the intermediate layers are circumferentially staggered or offset from each other. Radially adjacent intermediate plies are plies that are in different intermediate layers but are adjacent to one another radially. As shown, the radially adjacent intermediate plies are staggered such that their edges are not aligned but do have at least a portion of each intermediate ply that overlaps the other ply. The overlapping portions of the intermediate plies form a continuous path of ply material from the inner zone to the outer zone, referred to herein as a "spoke." The number of spokes within the tube may vary and corresponds with the number of plies per intermediate layer. For example, according to the illustrated embodiments, each intermediate layer 301-306 includes two intermediate plies 3011-3022 and the tube 10 includes two spokes 50, 60. One in the art should appreciate that additional spokes may be added to other embodiments of the tube. For example, the tube may have three or four spokes. In general, the numbers of spokes may be increased by decreasing the width of the intermediate plies compared to the circumference of the tube. For a particular cross-section of the tube and as shown in FIG. 2, each spoke 50, 60 extends non-radially along the circumference, i.e. the spoke extends from the inner zone 20 to the outer zone 40, with both a radial component and a circumferential component of direction. Although not evident from the cross-sectional view of FIG. 2, each spoke 50, 60 also extends helically along the length of the tube.

The spokes 50, 60 of the tube are spaced by complementary voids 70, 80 within the inner zone 20 of the tube. Circumferentially staggering or offsetting the intermediate plies 3011-3022 also circumferentially offsets the gaps S in the intermediate layers 301-306. Similar to the radially adjacent intermediate plies, radially adjacent gaps include overlapped portions relative to one another. A combination of the overlapped portions in the radially adjacent gap defines a void within the intermediate zone. In general, a void 70, 80 exists between one or more spokes 50, 60 and thus has a complementary shape to the spokes. As shown in FIG. 2, a void 70, 80 may extend non-radially from the inner zone 20 to the outer zone 30. According to the illustrated embodiment of FIG. 2, each void 70, 80 extends substantially over one half the circumference of the tube 10 and together the voids 70, 80 extend over the entire circumference of the tube 10 and portions of the voids 70, 80 circumferentially overlap each other. Also, the voids extend helically along the length of the tube.

Figure 5:
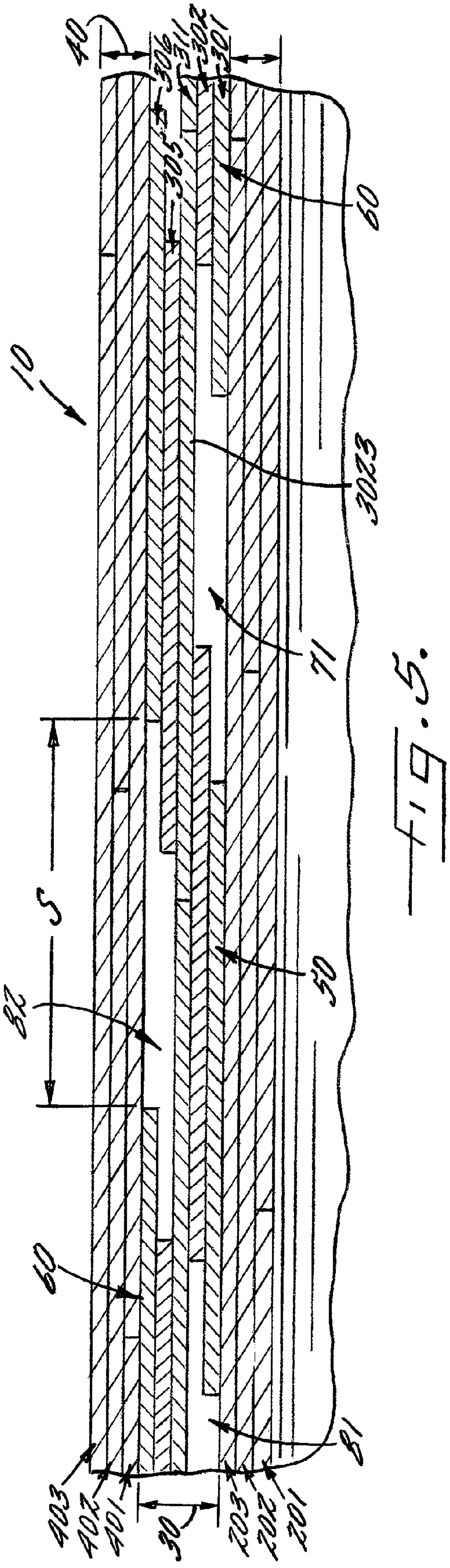
FIG. 5 is a cross-sectional view as in FIG. 3 of a tube according to another embodiment of the present invention.
Figure 6:
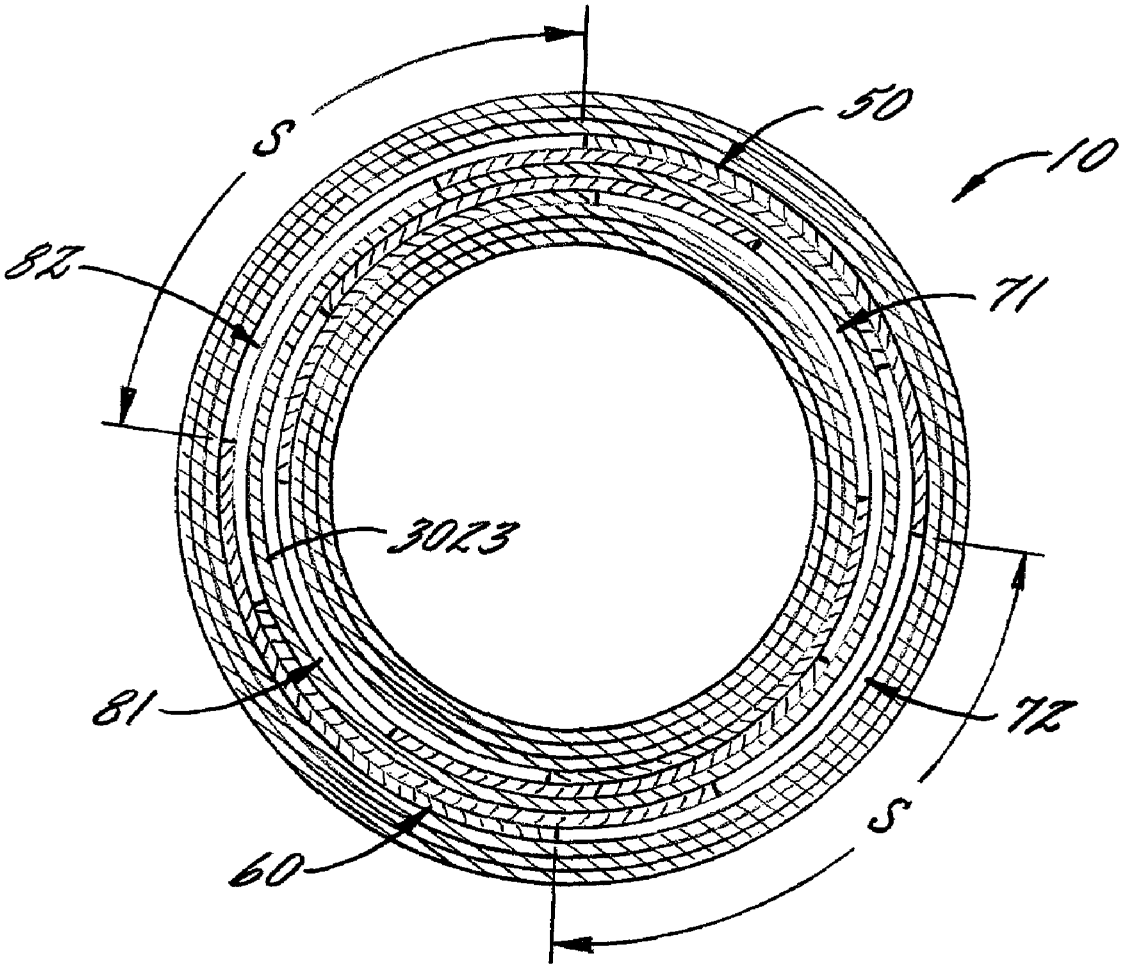
FIG. 6 is a cross-sectional view as in FIG. 2 of a tube according to the embodiment shown in FIG. 5.

Although the embodiment of FIGS. 1 through 3 includes one void between adjacent edges of the spokes, in other embodiments the tube may have more than one void between adjacent edges of the spokes. For example and as shown in FIGS. 5 and 6, the intermediate zone 20 may include one or more intermediate layers 311 that connect or "bridge" the spokes 50, 60, referred to herein as a bridge layer. At least one of the intermediate plies 3023 of the bridge layer is aligned and wide enough to extend across one spoke 50 to the other 60. In the illustrated embodiment of FIGS. 5 and 6, the intermediate zone 30 has four voids 71, 72, 81, 82. Two voids 71, 72 are between the adjacent edges of the spokes 50, 60 and extend from the inner zone 20 to the outer zone 40 and are divided by the bridge layer 311. Two additional voids 81, 82 are between the opposite adjacent edges of the spokes 50, 60 and extend from the inner zone 20 to the outer zone 40 and are divided by the bridge layer 311.

The bridge layer may have wider plies and different number of plies than the other intermediate layers. Also, the ply or plies of the bridge layer may be wound to have no gaps or a smaller gap than the gaps in the other intermediate layers. Therefore the plies of the bridge layer or layers may be substantially the same width as the outer and inner plies.

Figure 4:
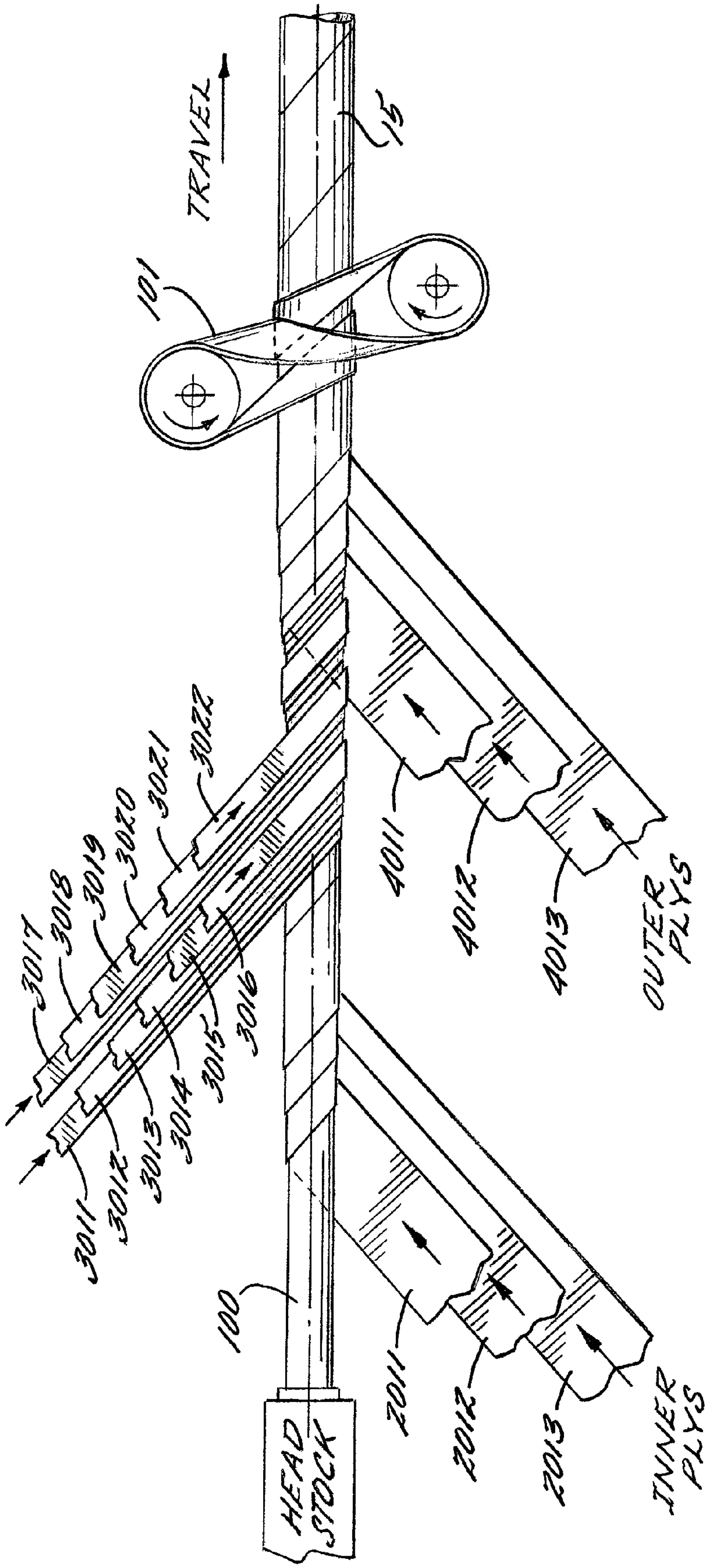
FIG. 4 is a partial plan view of an apparatus for forming a tube as shown in FIG. 1.

Another aspect of the present invention is a method or process of forming the tube 10. In general, the tube 10 is formed by spirally winding a plurality of plies about a mandrel 100, adhering the plies together, and severing portions or sections of the spirally wound plies to form individual tubes 10. FIG. 4 illustrates one method of making the paper tube 10 according to one embodiment of the present invention. The plies are drawn from respective creels (not shown) and routed along a path to the mandrel 100. Each ply may have an adhesive applied to it at an adhesive applying station (not shown) such as a glue pot for adhering to adjacent plies. The inner plies 2011, 2012, 2013 are applied to the mandrel 100 and spirally wound to form the inner layers 201, 202, 203 and thus inner zone of the tube. Downstream from the inner plies 2011, 2012, 2013, the intermediate plies 3011-3022 are applied on top of the inner zone and spirally wound to form the intermediate layers and thus the intermediate zone of the tube. More specifically, the intermediate ply or plies of a first intermediate layer are applied to the mandrel on top of the inner zone with gaps between the adjacent plies or adjacent edges of the ply. Next, the ply or plies of a second intermediate layer are applied to the mandrel on top of the first intermediate layer such that the plies of the second intermediate layer are partially offset from the plies of the first intermediate layers including having overlapping portions between the plies of the first and second intermediate layers. Additional intermediate layers may be applied including partially offsetting the plies of the subsequent intermediate layers with the plies of the preceding intermediate layers. However, in embodiments with bridge layers, the intermediate ply or plies of the bridge layers may be applied with no or a nominal gap between plies or edges. After applying the last intermediate layer and forming the intermediate zone, the outer plies 4011, 4012, 4013 are applied on top of the intermediate zone and spirally wound to form the outer layers 401, 402, 403 and thus the outer zone of the tube. A cut-off station (not shown) may be included to cut the continuous tube 15 formed by the spirally winding of the plies into discrete lengths to form individual tubes 10. A winding belt 101 rotates the continuous tube 15 in a screw fashion such that the tube 15 advances down the mandrel 100.

The non-radial spokes of the tube facilitate the transmission of torque from the inner zone to the outer zone during winding and handling operations, while insulating the inner diameter from radial pressure on the outer zone. More specifically, radial pressure on the outer zone will deform the spokes, and the voids provide an area for the movement of the voids, before affecting the inner zone or inner diameter of the tube. Therefore the spokes and voids provide an enhanced ID stiffness. Also, the spokes and voids may essentially extend around the entire circumference and length of the tube and thus provide for more consistent properties throughout the tube.

Many modifications and other embodiments of the invention set forth herein will come to mind to one skilled in the art to which this invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A spirally wound tube formed to have enhanced ID stiffness under radially inward compressive loads on the tube, the tube comprising:

an inner zone extending radially from an inner surface of the tube outwardly, the inner surface defining an inner diameter of the tube, the inner zone includes at least one inner layer of at least one inner ply;

an outer zone extending radially from an outer surface of the tube inwardly, the outer zone includes at least one outer layer of at least one outer ply; and an intermediate zone extending from the inner zone to the outer zone for insulating the inner diameter from the radially inward compressive loads, the intermediate zone comprising a plurality of intermediate layers and each intermediate layer having at least one intermediate ply, each intermediate ply being spirally wound such that a gap exists between consecutive turns of each intermediate ply;

wherein a plurality of the gaps of radially adjacent intermediate plies have overlapping portions that together define at least one void in the intermediate zone that extends radially for a distance greater than a thickness of any of the intermediate plies whose gaps define the void.

2. A spirally wound tube, comprising:

an inner zone, an outer zone, and an intermediate zone;

the inner zone being located radially inwardly and including at least one inner layer, each inner layer including at least one inner ply, each inner ply being spirally wound;

the outer zone being located radially outwardly and including at least one outer layer, each outer layer including at least one outer ply, each outer ply being spirally wound; and the intermediate zone being located between the outer zone and the inner zone and including a plurality of intermediate layers, each intermediate layer including one to a plurality of intermediate plies, each intermediate ply being spirally wound such that a gap exists between consecutive turns of the one to a plurality of the intermediate plies;

wherein a plurality of the gaps of radially adjacent intermediate layers have overlapping portions that together define at least one void in the intermediate zone, wherein each void extends circumferentially for a distance greater than a width of any of the intermediate plies and radially for a distance greater than a thickness of any of the intermediate plies.

3. The spirally wound tube according to claim 2, wherein the tube defines a circumference and the at least one void extends around at least a quarter of the circumference.

4. The spirally wound tube according to claim 3, wherein the gaps define two voids that together extend around the circumference.

5. The spirally wound tube according to claim 2, wherein the at least one void is separated by at least one non-radial spoke formed by a plurality of the intermediate plies and extending from the inner zone to the outer zone.

6. The spirally wound tube according to claim 5, wherein the intermediate plies form two spokes that together extend around a circumference of the tube.

7. A spirally wound tube formed to have enhanced ID stiffness under radially inward compressive loads on the tube, the tube comprising:

a plurality of plies spirally wound about an axis and adhered together to form a tube, a wall of the tube comprising a radially inwardly located zone, a radially outwardly located zone, and a radially intermediate zone located between the inwardly and outwardly located zones; the radially intermediate zone comprising a plurality of intermediate plies, each intermediate ply being spirally wound such that a gap exists between consecutive turns of each intermediate ply;

wherein a plurality of the gaps of radially adjacent intermediate plies have overlapping portions that together define at least one void in the intermediate zone that extends radially for a distance greater than a thickness of any of the intermediate plies whose gaps define the void.

8. The tube according to claim 7, wherein the intermediate zone defines two voids, each void extending circumferentially for at least half a distance around the axis.

9. The tube according to claim 7, wherein the intermediate zone defines at least two voids having partially overlapping portions about the axis and separated by at least two non-radial spokes.

10. The tube according to claim 9, wherein each non-radial spoke includes a plurality of intermediate plies extending from the inner zone to the outer zone and the non-radially spokes are partially circumferentially offset from one another.

11. The tube according to claim 10, wherein the tube includes at least one bridge layer extending from a first non-radial spoke to a second non-radial spoke.

12. A method of constructing a paperboard tube defining at least one non-radial spoke within a wall of the tube, the method comprising:

spirally winding from one to a plurality of inner plies about a forming mandrel to form an inner tube wall zone on the mandrel;

spirally winding from one to a plurality of intermediate plies to form a first intermediate layer having gaps between consecutive turns of the one to a plurality of intermediate plies;

partially offsetting one to a plurality of intermediate plies of a second intermediate layer relative to the one to a plurality of intermediate plies of the first intermediate layer and spirally winding the partially offset plies of the second intermediate layer such that each ply of the second intermediate layer partially overlaps a ply of the first intermediate layer such that there are gaps between consecutive turns of the one to a plurality of the intermediate plies of the second intermediate layer and such that the gaps of the first and second intermediate layers partially overlap to collectively form voids each of which extends radially for a distance greater than a thickness of any of the intermediate plies whose gaps define the void; and spirally winding from one to a plurality of outer plies to form an outer tube wall zone.

13. The method of claim 12, wherein the steps of spirally winding and partially offsetting the plies of the first and second intermediate layers are repeated for preceding and subsequent intermediate layers wherein the plies of subsequent layers are partially offset from the plies in preceding intermediate layers and spirally wound.

14. The method of claim 13, wherein the partially overlapping plies collectively form non-radial spokes extending between the inner and outer tube wall zones, and further including spirally winding one to a plurality of plies for forming a bridge layer, wherein at least one of the plies of the bridge layer extends from a first spoke to a second spoke.

* * * * *